US008177614B2

(12) United States Patent
Hall

(10) Patent No.: US 8,177,614 B2
(45) Date of Patent: May 15, 2012

(54) BLACKJACK VARIATION WITH UP-CARD BONUS

(76) Inventor: Geoff Hall, Shirley (GB)

( * ) Notice: Subject to any disclaimer, the term of this patent is extended or adjusted under 35 U.S.C. 154(b) by 623 days.

(21) Appl. No.: 12/250,521

(22) Filed: Oct. 13, 2008

(65) Prior Publication Data

US 2009/0170582 A1 Jul. 2, 2009

Related U.S. Application Data

(63) Continuation-in-part of application No. 10/963,899, filed on Oct. 13, 2004, now Pat. No. 7,435,172, which is a continuation-in-part of application No. 10/654,876, filed on Sep. 4, 2003, now abandoned, application No. 12/250,521, which is a continuation-in-part of application No. 12/127,785, filed on May 27, 2008, which is a continuation-in-part of application No. 10/963,899, filed on Oct. 13, 2004, now Pat. No. 7,435,172, which is a continuation-in-part of application No. 10/654,876, filed on Sep. 4, 2003, now abandoned.

(30) Foreign Application Priority Data

Sep. 4, 2002 (GB) ................................ 00220501.1
May 20, 2008 (GB) .................................. 0809118.3

(51) Int. Cl.
*A63F 13/00* (2006.01)

(52) U.S. Cl. ........................................................ 463/12

(58) Field of Classification Search ............... 463/11–13
See application file for complete search history.

(56) References Cited

U.S. PATENT DOCUMENTS

| | | | | |
|---|---|---|---|---|
| 5,415,414 | A * | 5/1995 | Savage | 273/306 |
| 7,036,821 | B2 | 5/2006 | Hall | |
| 7,080,839 | B2 * | 7/2006 | Shackleford | 273/292 |
| 7,435,172 | B2 | 10/2008 | Hall | |
| 2007/0138744 | A1 | 6/2007 | Hall | |
| 2007/0284821 | A1 | 12/2007 | Hall | |
| 2008/0227537 | A1 | 9/2008 | Hall | |

* cited by examiner

*Primary Examiner* — Peter DungBa Vo
*Assistant Examiner* — Jeffrey Wong
(74) *Attorney, Agent, or Firm* — Muskin & Cusick LLC

(57) ABSTRACT

A method, system, and computer readable storage medium to provide a variation of a blackjack game. If the dealer's up-card is of a predetermined card, then the dealer will automatically reveal the dealer's hole card, thereby providing the player with additional information. If the player's initial hand comprises a predetermined hand or hands, then the player can earn a bonus which can be multiplied based on a multiplier associated with the dealer's up-card.

14 Claims, 3 Drawing Sheets

BLACKJACK VARIATION WITH UP-CARD BONUS

CROSS REFERENCE TO RELATED APPLICATIONS

This application claims benefit of priority under 35 U.S.C. section 119 to Great Britain Application No. GB0809118.3, filed in the Great Britain Patent Office on May 20, 2008 by inventor Geoff Hall, the application of which is incorporated by reference herein in its entirety for all purposes. This application is also a continuation in part of application Ser. No. 10/963,899 filed Oct. 13, 2004 now U.S. Pat. No. 7,435,172 which is a continuation in part application of application Ser. No. 10/654,876 filed Sep. 4, 2003 now abandoned which claims benefit under 35 U.S.C. section 119 to Great Britain application No. 00220501.1, filed in the Great Britain Patent Office in Sep. 4, 2002, all three of these applications (Ser. Nos. 10/963,899; 10/654,876; 00220501.1) are incorporated by reference herein in their entireties for all purposes. This application is also a continuation in part of application Ser. No. 12/127,785 filed May 27, 2008, which is incorporated by reference herein in its entirety, which is a continuation in part of application Ser. No. 10/963,899 filed Oct. 13, 2004 now U.S. Pat. No. 7,435,172 which is a continuation in part application of application Ser. No. 10/654,876 filed Sep. 4, 2003 now abandoned which claims priority under 35 U.S.C. section 119 to Great Britain application No. 00220501.1, filed in the Great Britain Patent Office in Sep. 4, 2002,

BACKGROUND OF THE INVENTION

1. Field of the Invention

The present inventive concept relates to a system, method, and computer readable storage, for playing a variation of a casino blackjack game.

2. Description of the Related Art

Casino blackjack games are known in the art. What is needed is a new variation of casino blackjack game that can create additional excitement for players

SUMMARY OF THE INVENTION

It is an aspect of the present general inventive concept to provide an exciting wagering game.

The above aspects can also be obtained by a method that includes (a) receiving a main wager from a player; (b) dealing a player's initial hand; (c) dealing a dealer's initial hand comprising an up-card face up and a hole card face down; (d) determining if the up-card is a predetermined card(s), and if so, then revealing the hole card; (e) playing out, by the player, the player's hand; (f) playing out, by the dealer, the dealer's hand; and (g) resolving the main wager using at least the player's hand.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
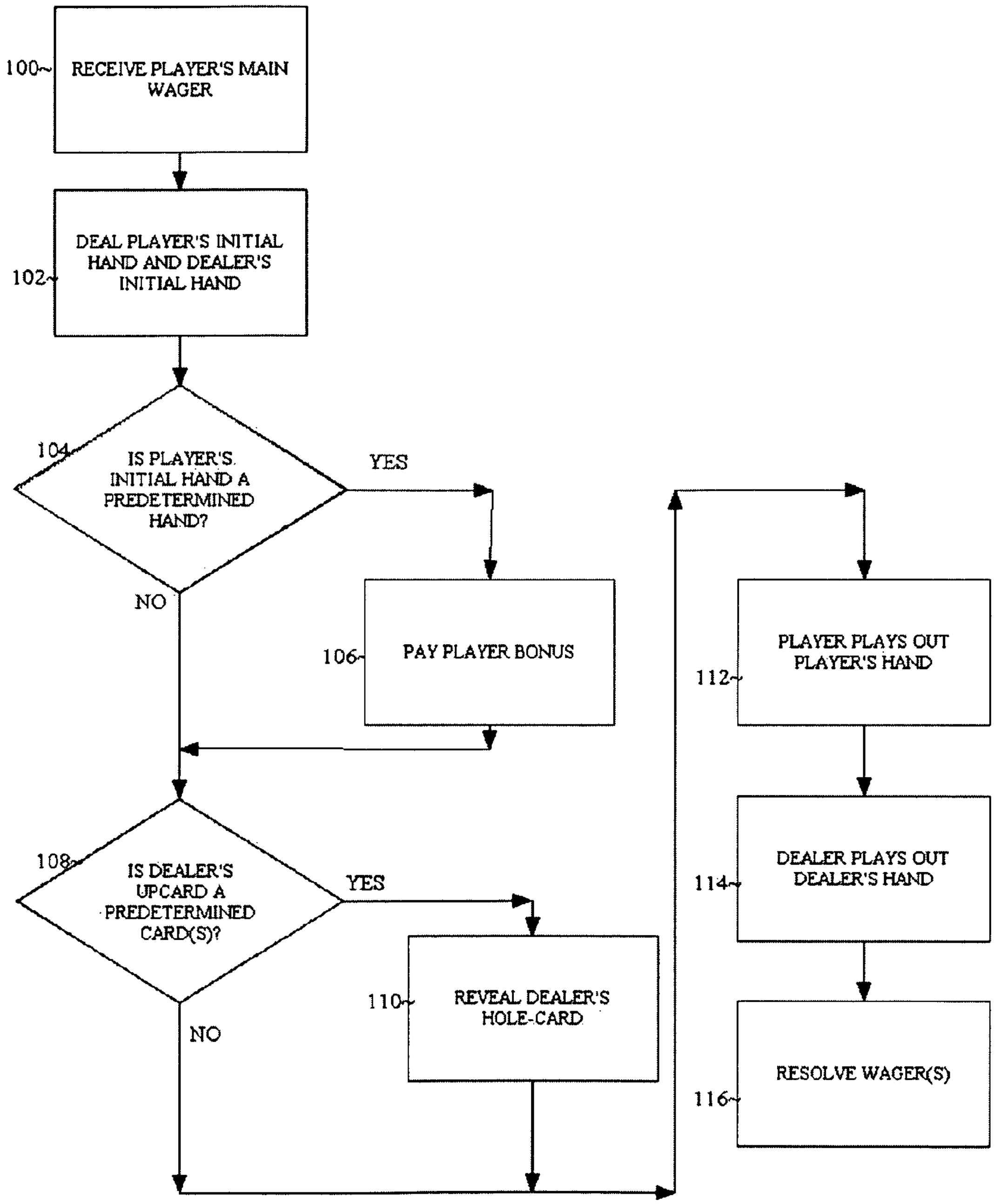
FIG. 1 is a flowchart illustrating an exemplary method of implementing a wagering game, according to an embodiment.

Reference will now be made in detail to the presently preferred embodiments of the invention, examples of which are illustrated in the accompanying drawings, wherein like reference numerals refer to like elements throughout.

The general inventive concept relates to a game involving blackjack. Blackjack is a well known game in the art, for example see U.S. patent publication 2003/0155715, which is incorporated by reference here in its entirety.

In one embodiment, a modification of blackjack is provided which allows the casino to enjoy an additional edge in the game, by allowing the dealer to "push" i.e. not pay players when the dealer has reached a designated total higher than 21. The game can be played with any number of deck of cards.

Normally, in the game of regular Blackjack, any total of 22-26 is considered a "bust" hand so, by choosing 1 or more of these totals to now be a "push", will create an extra edge for the casino.

To compensate for this extra edge given to the casino, other player-beneficial rules can be added within the game, to allow the casino edge to reduce overall to a similar edge found in regular Blackjack. Examples such as paying higher than normal odds for "Blackjacks", allowing players to place additional bets after seeing their initial cards and allowing more favorable "doubling" and "splitting" opportunities are a few of the player benefits that could be included.

Additionally, players will be allowed to wager on whether the dealer will arrive at the specified "push" total, or totals. A specially designed layout will include betting areas that allow players the option of placing a further bet (see diagram attached) and the player will win the get if a wager has been placed in the specified betting area and the dealer has made the designated total.

Ideally, the dealer will just "push" on one designated total between 22-26 and the name of the game can reflect which total has been included in the rules. For example, a game called "Blackjack Push 26" will inform the players that the dealer will "push" players' bets on a total of 26. Obviously, the specially designed layout will include betting areas that allow the player to wager on the outcome of the dealer making a total of 26.

A preferred embodiment of the invention will now be described, with reference to the attached diagram.

A specially designed layout is used with additional betting areas having "22" marked on them (see item "B" in diagram), as this particular embodiment allows the dealer to "push" on a total of 22. Each "Blackjack" betting area is divided in half (see item "A" in the diagram) to allow players to place 2 identical "Blackjack" wagers. As the dealer is allowed to "push" on a total of 22, then the players advantageous rule is that after receiving their first 4 cards, that make up the start of each of their 2 Blackjack hands, they can then decide in which order the second cards are placed. In other words, once the players have received their 2 Blackjack hands they then have the option to switch over their 2 top cards (i.e. the second cards from each Blackjack hand). For example, the player is dealt a six and an Ace as his first cards, which make up the initial part of each of his Blackjack hands. Then the player receives a "Jack", on top of the 6 to make "16" and a "4", on top of the Ace' to make "soft" 15. As the Jack and four are the second cards dealt out, then the player may switch these 2 cards over, or, put simply, interchange them. The player will now have one hand consisting of a six and a four and the other hand consisting of an ace and a jack.

Once the player has decided whether to "switch", or not, then both of the player's hands are played out as in regular Blackjack.

Additionally, the player can place a wager in the "22" betting area, before any cards are dealt out. This wager is left until it is the dealer's turn to play his hand. If the dealer makes any total other than 22, then he takes the player's "22" wager. However, if the dealer makes a total of 22 then he will pay the player a predetermined odds, for example 10/1.

The preferably number of player betting boxes, for this particular embodiment, would be 5 although this could be increased or decreased if the casino so desires.

As well as this specific embodiment, the invention could contain one or more of the following:

(i) In the second embodiment, "Blackjacks" would still be paid even if the dealer had reached the designated "push" total.

(ii) In the third embodiment, higher odds could be awarded to the player placing a "push total" bet if the dealer's "push total" was made up of a specific holding. For example, in "Push 22", the player could be paid much higher odds, for example 25/1, if the dealer were to obtain a total of 22 with four cards of rank, for example 4, 5, 6 & 7, in any order. Again, even higher odds, for example 100/1, could be paid if the 22 was obtained by the four cards of rank specified above were dealt in order or if the four cards of rank specified above were of the same suit.

(iii) In the fourth embodiment, the "push" feature can be included in games of Blackjack where the player is only required to play one hand.

(iv) In the fifth embodiment, the player would be allowed to increase the initial wager, if desired, after seeing either one, or more, of his own cards and also, as extra option, after seeing the dealer's upcard. Any mixture of this could be advocated depending on the casino's edge requirements.

(v) Suited "Blackjacks" could be paid at higher odds than the usual 3/2 payout.

(vi) "Blackjacks" could be paid at even money.

(vii) If players hand comprised three of four cards constituting a specified three/four card poker hand, for example three/four of a kind; a straight; a flush; or a straight flush, the hand would be an automatic winner, irrespective of the total, provided that the total is below 22. Bonus odds may be paid out, depending on the rank of the poker hand, for example 3/1 for three of a kind or a straight flush.

(viii) If a player is dealt a designated wild card, for example card of designated rank e.g. 10, or reaches a designated value, then the bet will be pushed, if the players total subsequently exceeds 21.

In a further embodiment, special bonuses and additional features can be included in a blackjack game depending on the dealer's up-card. The dealer's up-card is the card that the dealer shows to the players before they play their hands. In America, the dealer will also receive a second card, called a 'hole' card, which is face down, so that the players cannot see the card. In Europe, the dealer only receives one card, called 'the European No Hole Card Rule' and will deal a $2^{nd}$ card after the players have played out their hands.

Typically, in the traditional game of blackjack, casinos add side-bets in order to make the game more varied for the players. Generally, players have the option as to whether they wish to place a wager on the side-bet or whether to play the regular blackjack game. Additionally, some games include added features that don't require an additional wager by the player. These games will have rules designed to allow the casino to still make an overall edge on the game despite adding extra bonuses or features. An example of this type of game would be 'Blackjack Switch' which allows players to switch cards between two hands. If the 'switch' was added as an extra feature on regular blackjack then the players would benefit by having the overall edge on the game. Therefore, other rules are added to the game in order to compensate for the 'switch' feature. In the case of 'Blackjack Switch', the dealer can push all players' non-busted hands with a dealer total of 22 (or other total) instead of paying them out as would be the case in the regular game. In order to offer extra features, or bonuses, then there must be corresponding, compensating rules in order for the casino to retain a house edge in the newly adapted game.

Typically, blackjack side bets use payouts that will be the same regardless of the circumstances how it was won. In an embodiment, the payout can vary according to the dealer up-card. For example, if the player is dealt a particular bonus hand, then instead of receiving fixed odds the payout will be paid at the odds dependent upon the dealer up-card. For example, if the dealer's up-card is a 5 then the player can receive a 5 to 1 payout for achieving a particular bonus hand. If the dealer's up-card is a king then the player can receive 10 to 1 (as face cards will count as 10 and Aces as 11) for the bonus hand. The payout can match the rank of the dealer's up card (although in an alternate embodiment some or all payouts do not have to match). The casino can decide the odds associated with the cards and could even have a particular card, for example an ace of spades, as paying a special, higher bonus. Furthermore, if higher payouts were needed, as the particular bonus hand was more difficult to achieve, then the bonus could pay odds on a multiple of the dealer's up-card i.e. dealer's up-card times 10 could equal the odds paid to the player, hence, in this example, if the dealer were to have a 3 as an up-card then the player would receive odds of 30 to 1.

In a further embodiment, the dealer's up-card could also be used to create a special feature, rather than just a bonus payout, incorporated into a game. The feature would work by allowing the players to see the dealer's second card (e.g., the dealer's 'hole' card) if a particular card, or cards, comprised the up-card. For example, the special feature could apply whenever the dealer had an Ace as an up-card. This will happen approximately once in every 13 hands and, when the situation arises, the dealer will reveal the 'hole' card for the players to see. Thus, for example, if the dealer's up card is an Ace, then the dealer would automatically reveal the dealer's hold card (for example, an eight). The player's now know what the dealer's hand is (a point total of 19) and should play their hand accordingly with this information. If the dealer's upcard was not an ace, then the dealer would not reveal the dealer's hole card. Of course, other cards could be used to trigger the revealing of the hole card feature, or multiple cards could be used as well (e.g., whenever the dealer's up card is a 2-3 the dealer's hole card is then revealed).

An example configuration of the methods described herein will now be presented. One or two decks are suggested for this version although the casino may use more decks if they wish. In this version, the bonus hand, that the player is required to achieve, is to be dealt 6, 6 as the player's first two cards. If this happens then the player will be paid at odds depicted by the dealer's up-card. Thus, for example, if the player is dealt a pair of sixes and the dealer's up card is a 2, then the player is paid two times the player's wager (either the player's initial wager or a side wager, depending on the embodiment). If the dealer's up-card was a 7, then the dealer would be paid seven times the player's wager (either the player's initial wager or a side wager, depending on the embodiment). Of course, the bonus hand can comprise any other pair besides 6/6, and in fact the bonus hand does not have to be a pair (for example, the bonus hand can be an ace hearts/king hearts).

A special feature can apply whenever the dealer has a 2 as an up-card (or any other rank). In this example, when the dealer's up-card is a 2 (of any suit), the dealer will simply reveal the 'hole' card to the players and play will then continue as in the regular game. Thus, when the player's play out their respective hands, they have additional information in knowing what the dealer's hole card is. If the dealer's up-card did not meet the predetermined criteria (e.g., being 2), then the dealer would not reveal his or her hole card now and would reveal it when it is time for the dealer to play out the dealer's hand (in operation 112), thus the players would play out their hands without knowing what the dealer's hole card is). In a further embodiment, the suit of the dealer's up-card matters in order to trigger the revealing of the hole-card. For example, the dealer's up-card must be a 3-clubs or 3-diamonds in order to reveal the dealer's hole card, but if the dealer's up-card is not a 3-clubs or 3-diamonds then the dealer would not reveal the dealer's up-card until all the players have finished playing out there hands (in other words the method has reached operation 114). The dealer's up-card can be compared against any predetermined set of cards in order to trigger the revealing of the dealer's hole card only if the dealer's up-card belongs to the set.

A further special feature, called 'Picture Pair', is also incorporated into this version, whereby any player who is dealt Jack, Jack or Queen, Queen or King, King is paid instantly, at odds of 1 to 1 and does not have to play out the hand to the finish i.e. achieving a 'Picture Pair' is an instant winner and achieving 6, 6 pays out an up-card bonus (although the player with 6, 6 will continue to play out the hand after being paid the bonus). In a further embodiment, embodiment, the 'Picture Pair' bonus would only be paid out if the dealer's up-card was within a range of values, for example if the dealer's up-card is 9 or lower then the payout is made otherwise the hand has to be played out as in the regular style.

Of course, incorporating these added bonuses and features will give the players an added advantage, so a compensating rule, or rules, is needed to allow the house to enjoy an edge on the game. In this example, the dealer can use a compensating rule that any dealer total of 26 will simply push the players' remaining hands rather than paying out the wagers, although any form of compensating rules may be used to readdress the house edge.

Table I below illustrates an example paytable of paying the player a bonus based on the player's initial hand and the dealer's up-card. For example, if the player bets $1 on the main wager and is dealt a pair of sixes (the suit does not matter), and the dealer's up-card is a 2, the player is paid a bonus of $2 ($1 multiplied by the payout of 2:1). In the embodiment which uses a side wager, the bonus would only pay out if the player placed the side wager. For example, if the player placed a $1 side wager in operation 100, then if the player was dealt an initial hand of 6/6 and the dealer's up-card is a 2, then the player wins a payout on the side wager of $2. It is noted that the bonus can be configured to use any card combinations for the player's initial hand, including ones that rely on suit (e.g., a 5 spades and 6 clubs are both needed in the player's initial hand to trigger the bonus).

TABLE I

| Player's initial hand | Dealer's up-card | Payout |
|---|---|---|
| 6, 6 | A | 1:1 |
| 6, 6 | 2 | 2:1 |
| 6, 6 | 3 | 3:1 |
| 6, 6 | 4 | 4:1 |
| 6, 6 | 5 | 5:1 |
| 6, 6 | 6 | 6:1 |
| 6, 6 | 7 | 7:1 |
| 6, 6 | 8 | 8:1 |
| 6, 6 | 9 | 9:1 |
| 6, 6 | 10, J, Q, K | 10:1 |

Table II below is another example of a bonus paytable, this paytable showing that different initial hand combinations can be used as well as groups of dealer's up-cards can be treated equally.

TABLE II

| Player's initial hand | Dealer's up-card | Payout |
|---|---|---|
| Any pair of 5's | 2-8 | 0 |
| Any pair of 5's | 9 | 1:1 |
| Any pair of 5's | 10, J, Q, K | 2:1 |
| Any pair of 5's | A | 4:1 |
| Ten diamonds/ten hearts | A-5 | 0 |
| Ten diamonds/ten hearts | 6-9 | 2:1 |
| Ten diamonds/ten hearts | 10, J, Q | 3:1 |
| Ten diamonds/ten hearts | Kclubs/Kspades/Khearts | 4:1 |
| Ten diamonds/ten hearts | Kdiamonds | 5:1 |

FIG. 1 is a flowchart illustrating an exemplary method of implementing a wagering game, according to an embodiment.

The method can begin with operation 100, wherein the player places a main wager on an outcome of the blackjack game. If the player wins the overall blackjack game, the player wins the main wager and if the player loses the overall blackjack game then the player loses the main wager. In an alternate embodiment, in addition to the main wager, the player can also place a side wager.

From operation 100, the method proceeds to operation 102, which deals a player's initial hand a dealer's initial hand. The player's initial hand can be dealt face up or face down and typically consists of two cards. The dealer's initial hand comprises one up-card (dealt face up) and one hole card (dealt face down).

From operation 102, the method proceeds to operation 104, which determines whether the player's initial hand is a predetermined hand (or one of a set of predetermined hands).

If the player's initial hand is a predetermined hand, then the method proceeds to operation 106, which pays the player a bonus. In one embodiment, the bonus is paid based on the main wager placed in operation 100. In another embodiment, the bonus is paid based on a side wager placed in operation 100. The bonus is determined using a paytable based on the player's initial hand and the dealer's up-card. Payout tables, such as Table I or Table II can be used to determine the bonus amount. Of course any other configured table can be used as well.

In an alternate embodiment, instead of the dealer's up-card, the dealer's 'hole' card could be used to determine the bonus odds. Furthermore, a combination of both the dealer's up-card and 'hole' card could have a mathematical function performed on them in order to compile the odds for a bonus payout.

From operations 104, 106, the method proceeds to operation 108, which determines whether the dealer's up-card is a predetermined card or set of cards. If the dealer's up-card is a predetermined card or set of cards, then the method proceeds to operation 110, which reveals (turns face up) the dealer's hole card. The players now have this additional information and can use this additional information when deciding how to play out their hand in operation 112.

From operations 108, 110, the method proceeds to operation 112, wherein the player plays out his or her respective hand (starting with the player's initial hand dealt in operation 102). Typically, the player will decide to hit, stand, double, or split. If the method had reached operation 110, then the player will have the additional information of knowing the dealer's hole card. If the method did not reach operation 110, then the player would not know the dealer's hole card. The player can continue to hit on a hand until the player's point total is over 21 (the player busts) or the player decides to stand. The player's hand comprises the player's initial hand and any additional cards taken by the player in operation 112.

From operation 112, the method proceeds to operation 114, wherein the dealer resolves (plays out) the dealer's hand. In operation 114, the dealer reveals (turns face up) the dealer's hole card, that is if it had not already been revealed previously. Typically all cards dealt in operation 114 are dealt face up. The dealer resolves his or her hand typically by following predetermined rules. For example, the dealer can continue to hit until the dealer has a point total of 17, upon which the dealer stands. The dealer's hand comprises the dealer's initial hand and any additional cards taken by the dealer in operation 114.

From operation 114, the method proceeds to operation 116, which resolves the main wager placed in operation 100. If the player wins the overall blackjack game (the point total of the player's hand not greater than 21 and either the point total of the player's hand is higher than the point total of the dealer's hand or the dealer has busted), the player typically wins even money on the main wager. If the player loses the overall blackjack game (the player has busted or the point total of the player's hand is not higher than the point total of the point total of the dealer's hand), the player typically loses the main wager. If the player has not busted and the point total of the player's hand equals the point total of the dealer's hand, then the main wager pushes (neither wins or loses).

Optionally, any bonus earned by the player's initial hand in operation 106 can also be paid during operation 116 as well (instead of being paid during operation 106). The bonus can be paid based on a side bet made in operation 100 (if the embodiment being played uses a side bet) or alternatively the bonus is based on the main wager in operation 100.

Figure 2A:
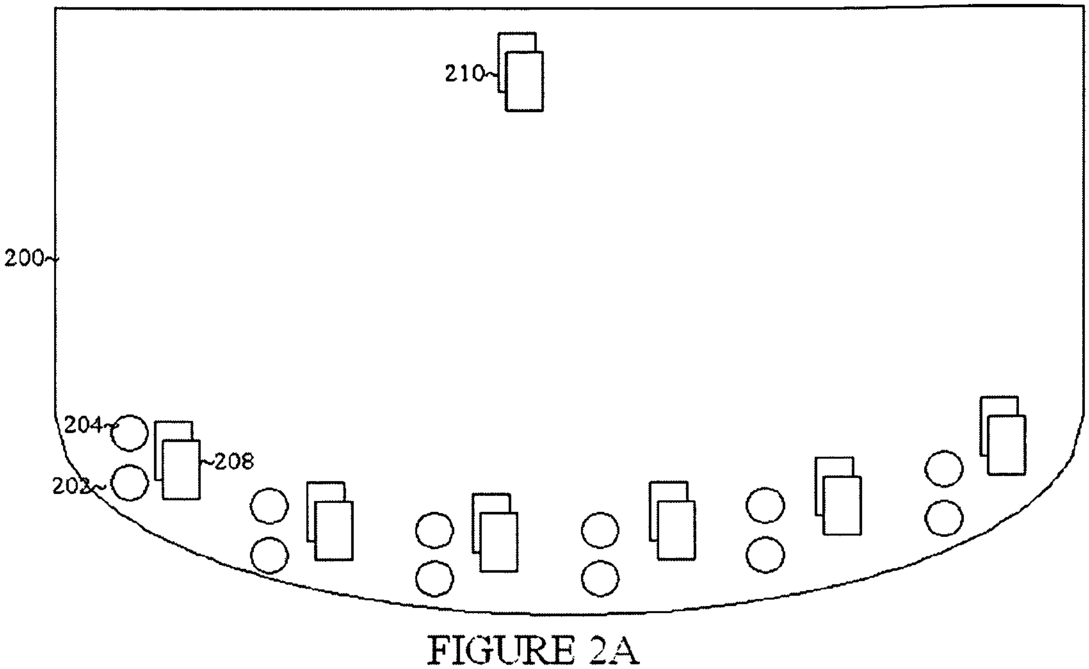
FIG. 2A is drawing illustrating an example of a gaming table using a side bet embodiment, according to an embodiment.

FIG. 2A is drawing illustrating an example of a gaming table using a side bet embodiment, according to an embodiment;

A gaming table 200 can accommodate any number of players. A dealer's hand 210 is shown along with a first player's hand 208. A first player's main wager betting circle 202 is used to receive the first player's main wager. A first player's side wager betting circle 204 is used to receive the first player's side wager. The side wager can be placed optionally by the player, and can typically be any amount. In a further embodiment, the amount of the side wager can be less than or equal to the main wager (but not greater).

Figure 2B:
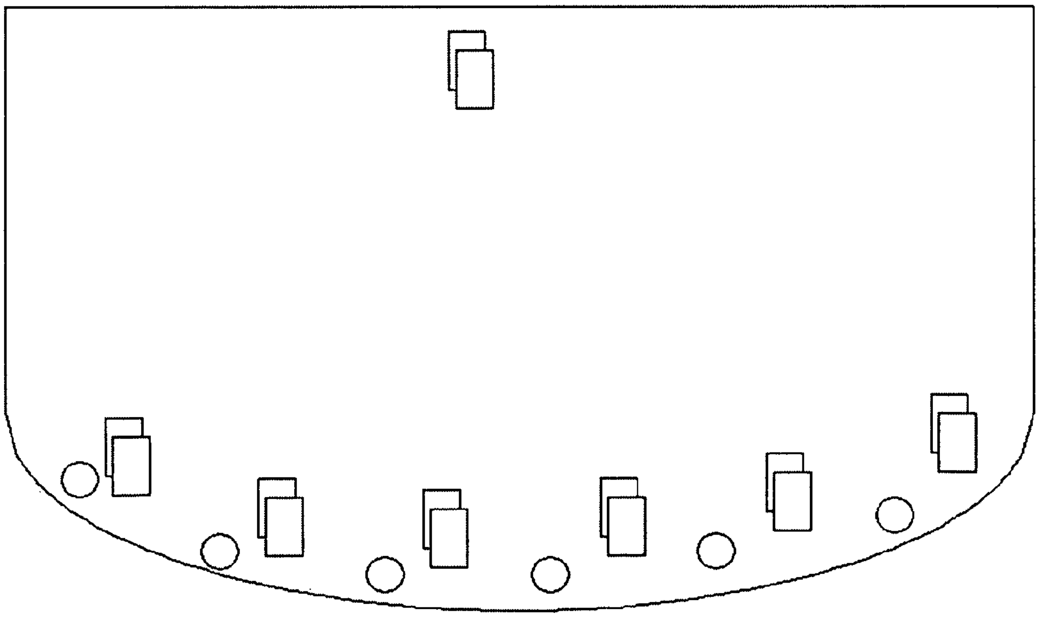
FIG. 2B is a drawing illustrating a further example of a gaming table without a side bet, according to an embodiment.

In a further embodiment, as described herein, a side wager is not required to pay bonuses. FIG. 2B is a drawing illustrating a further example of a gaming table without a side bet, according to an embodiment. This layout is similar to FIG. 2A but there is no side wager betting circle for each player.

An actual example of game play will now be presented. Three players, player A, player B and player C, sit down and place bets in the betting spots marked on the table. The dealer will deal 2 cards to the players and the dealer's hand will also comprise 2 cards, one of the cards being face down (the hole card) and one face up (the up-card). Some games, called 'European No Hole Card' will allow the dealer to receive just one card face up and will deal the second player's card when it is time for the dealer to play out the dealer's hand. In the case of the European No Hole Card rule, if the dealer is to reveal the hole-card based on the dealer's up-card, then the dealer's second card will then be dealt face up which will now be considered the dealer's revealed hole card. This example uses a "reveal 2" rule, that is, whenever the dealer's up-card is a rank of 2 (regardless of suit), the dealer's hole card will be revealed (turned face up or dealt face up if needed). This example also uses a "push on 26" rule, that is, if the player did not bust but the dealer busts on a point total of 26, the player's main wager would push instead of win.

Player A is dealt King Hearts, King Diamonds, player B is dealt 6 spades, 6 hearts and player C is dealt 4 clubs, 7 spades. The dealer turns over the 2 diamonds as the up-card for the dealer's hand.

Player A is dealt a 'Picture Pair' and is paid immediately at odds of 1 to 1 and has the cards placed into the discard tray. Player A will play no further part in this round. Player B has achieved the bonus hand of 6, 6 and will be paid at odds of 2 to 1 as the dealer's up-card is a 2. The player's cards are left there and the hand is still to be paid out. Player C has no special bonus hand.

As the dealer has a 2 as an up-card, then the dealer must reveal the 'hole' card as this version incorporates the 'revealed 2' rule. The dealer reveals the 8 clubs so the players now know that the dealer has a total of 10 with the first 2 cards. If the dealer did not have a 2 as the up-card, the dealer would not reveal the dealer's hole card.

Player B would normally split 6, 6 verse a dealer 2 but with the added information that the dealer now has a total of 10 decides to take a card. The dealer deals a 4 hearts to player B who now has a total of 16. Player B hits again and this time receives the Queen of Diamonds which now gives the player a total of 26. This is a 'bust' hand and the player loses. Therefore, player B's cards are picked up and placed in the discard tray and the player's wager is also taken and put into the dealer's chip tray.

Player C decides to double his wager and places an additional bet beside his original wager. Doubling and splitting will follow regular blackjack procedure so the player is allowed one card only in this version. The dealer deals the 9 spades to the player giving player C a total of 20. The dealer now plays out the dealer's hand and draws the 6 clubs followed by the Jack of Clubs. This gives the dealer a total of 26 and so the dealer simply pushes player C's wager (including the additional double wager) instead of paying it. Player A has already won and player B has 'busted' so no other action is required by the dealer after pushing player C's wager.

Figure 3:
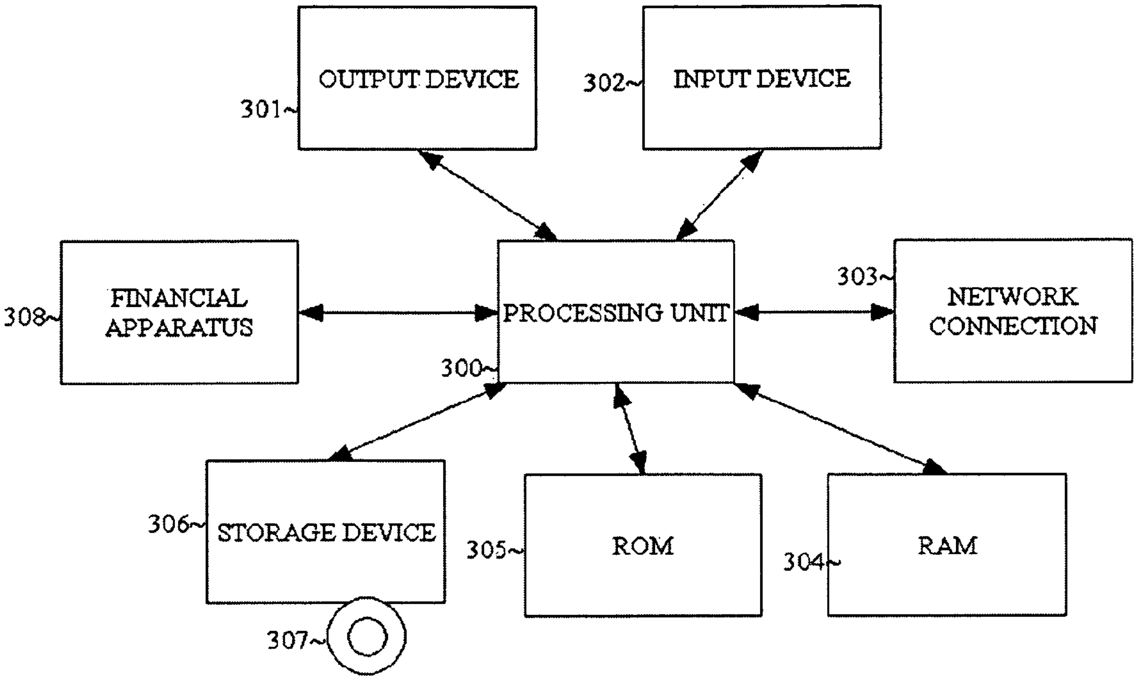
FIG. 3 is a block diagram illustrating exemplary hardware that can implement an electronic version implementing methods described herein, according to an embodiment.

FIG. 3 is a block diagram illustrating exemplary hardware that can implement an electronic version implementing methods described herein, according to an embodiment. In addition to being played in a physical casino table, the methods described herein can also be played on an electronic gaming device or on a computer using the Internet.

A processing unit 300 (such as a microprocessor and any associated components) is connected to an output device 301 (such as an LCD monitor, touch screen, CRT, etc.) and an input device 302 (e.g., buttons, a touch screen, a keyboard, mouse, etc.) The processing unit 300 can also be connected to a network connection 303, which can connect the electronic gaming device to a computer communications network such as the Internet, a LAN, WAN, etc. The processing unit 300 is also connected to a RAM 304 and a ROM 305. The processing unit 300 is also connected to a storage device 306 which can be a DVD-drive, CD-ROM, flash memory, etc. A computer readable storage medium 307 can store a program which can control the electronic device to perform any of the methods described herein. The processing unit 300 can also be connected to a financial apparatus 308 which can receive cash and convert the received cash into playable credits for use by the player when playing the electronic device. When the player decides to cash out any remaining credits, the financial apparatus 308 can issue coins or a cashless ticket (voucher) for the remaining credits which is redeemable by the player.

It is noted that the methods described herein can be played using any number of decks (e.g., 1-8 or more). Standard decks of 52 cards can be used, as well as other kinds of decks, such as Spanish decks, decks with wild cards, etc. The operations described herein can be performed in any sensible order. Furthermore, numerous different variants of house rules can be applied. For example, in blackjack, the dealer can hit on soft 17 or stand on soft 17, depending on house rules. Cards can be given their standard point values as known in the art (e.g., 2-10 have their face value, jack, queen, and king, have a point value of 10, and ace has a point value of 1 or eleven).

The methods herein are not limited to games with cards, and can also be applied to games using dice, wheels, etc.

The descriptions provided herein also include any hardware and/or software known in the art and needed to implement the operations described herein. Further, all methods described herein can be programmed on a digital computer and stored on any type of computer readable storage medium.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a blackjack game, the method comprising:
- executing the following instructions on an electronic processing unit on a computer:
- receiving a first wager from a player;
- dealing a player's initial hand;
- dealing a dealer's initial hand comprising an up-card face up and a hole card face down;
- determining whether the player's initial hand is in a set of predetermined two cards;
- upon a determination that the player's initial hand is in the set of predetermined two cards, paying to the player a bonus amount, the bonus amount being determined using the dealer's up-card and is a multiple of an amount of the first wager; and
- resolving the blackjack game according to predetermined rules.

2. The method as recited in claim 1, wherein the up-card determines the multiple.

3. The method as recited in claim 2, wherein different up-cards have different respective multiples.

4. The method as recited in claim 1, further comprising, before dealing the player's hand, receiving a second wager from the player, wherein the first wager is a side wager and the second wager is based on a result of the blackjack game.

5. The method as recited in claim 4, wherein the up-card determines the multiple.

6. The method as recited in claim 5, wherein different up-cards have different respective multiples.

7. The method as recited in claim 1, wherein the first wager is a main wager based on a result of the blackjack game.

8. An apparatus, comprising:
- an electronic output device; and
- an electronic processing unit operationally connected to the output device and configured to execute instructions which perform:
- receiving a first wager from a player;
- dealing a player's initial hand;
- dealing a dealer's initial hand comprising an up-card face up and a hole card face down;
- determining whether the player's initial hand is in a set of predetermined two cards;
- upon a determination that the player's initial hand is in the set of predetermined two cards, then paying to the player a bonus amount, the bonus amount being determined using the dealer's up-card and is a multiple of an amount of the first wager; and
- resolving the blackjack game according to predetermined rules.

9. The apparatus as recited in claim 8, wherein the up-card determines the multiple.

10. The apparatus as recited in claim 9, wherein different up-cards have different respective multiples.

11. The apparatus as recited in claim 8, wherein the processing unit is further configured to perform, before dealing the player's hand, receiving a second wager from the player, wherein the first wager is a side wager and the second wager is based on a result of the blackjack game.

12. The apparatus as recited in claim 11, wherein the up-card determines the multiple.

13. The apparatus as recited in claim 12, wherein different up-cards have different respective multiples.

14. The apparatus as recited in claim 8, wherein the first wager is a main wager based on a result of the blackjack game.

* * * * *